United States Patent
Anagnost et al.

(10) Patent No.: US 9,121,865 B2
(45) Date of Patent: Sep. 1, 2015

(54) HUNG MASS ACCELEROMETER WITH DIFFERENTIAL EDDY CURRENT SENSING

(71) Applicant: Raytheon Company, Waltham, MA (US)

(72) Inventors: John Joseph Anagnost, Torrance, CA (US); Andrew Lyle Bullard, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 378 days.

(21) Appl. No.: 13/712,290

(22) Filed: Dec. 12, 2012

(65) Prior Publication Data

US 2014/0157897 A1    Jun. 12, 2014

(51) Int. Cl.
  *G01P 15/08*    (2006.01)
  *G01P 15/11*    (2006.01)
  *G01P 15/00*    (2006.01)
  *G01P 15/13*    (2006.01)

(52) U.S. Cl.
  CPC .............. *G01P 15/11* (2013.01); *G01P 15/005* (2013.01); *G01P 15/132* (2013.01)

(58) Field of Classification Search
  CPC ............. G01P 1/023; G01P 3/42; G01P 3/50; G01P 15/005; G01P 15/11; G01P 15/132
  USPC ............... 73/514.35, 514.23, 514.14, 514.16, 73/514.08, 514.31
  See application file for complete search history.

(56) References Cited

U.S. PATENT DOCUMENTS

| | | | |
|---|---|---|---|
| 3,508,445 A * | 4/1970 | Gagnon et al. ............. | 73/514.12 |
| 4,563,643 A | 1/1986 | Leschek et al. | |
| 4,816,759 A * | 3/1989 | Ames et al. .............. | 324/207.17 |
| 4,866,418 A | 9/1989 | Dobler et al. | |
| 5,214,379 A | 5/1993 | Chern | |
| 5,756,896 A * | 5/1998 | Schendel ................... | 73/514.08 |
| 6,062,081 A * | 5/2000 | Schendel ................... | 73/514.08 |
| 6,912,902 B2 | 7/2005 | Malametz et al. | |
| 7,104,128 B2 | 9/2006 | Inglese et al. | |
| 7,757,555 B2 | 7/2010 | Pan et al. | |
| 2003/0071612 A1 | 4/2003 | Daalmans et al. | |
| 2003/0193396 A1 | 10/2003 | Daalmans et al. | |
| 2010/0083761 A1* | 4/2010 | Dwyer et al. .............. | 73/514.31 |
| 2011/0203377 A1* | 8/2011 | Seto ................................ | 73/649 |
| 2011/0252887 A1* | 10/2011 | Cardarelli .................. | 73/514.32 |

FOREIGN PATENT DOCUMENTS

DE    102007005297 A1    11/2007

OTHER PUBLICATIONS

Accelerometer Design, Chapter 2, http://14.139.116.29/bitstream/10603/2272/8/08_chapter%202.pdf, 2008.

(Continued)

*Primary Examiner* — Hezron E Williams
*Assistant Examiner* — Tarun Sinha
(74) *Attorney, Agent, or Firm* — Eric A. Gifford

(57) ABSTRACT

A new class of accelerometer uses a differential Eddy current sensor to sense the displacement of the proof mass. This accelerometer can provide improved performance in an open-loop configuration based on the thermal stability and improved linearity of the differential Eddy current sensor. The accelerometer may provide lower cost alternatives to commercial grade accelerometers and lower cost and higher reliability alternatives to strategic grade accelerometers.

20 Claims, 6 Drawing Sheets

(56) References Cited

OTHER PUBLICATIONS

Blueline Engineering, Inductive Eddy Current Technology, http://www.bluelineengineering.com/Eddy%20Current%20Sensors.html, 2012.

Garcia-Martin et al. "Non-destructive Techniques Based on Eddy Current Testing," Sensors 2011, 11, ISSN 1424-8220, published Feb. 28, 2011, pp. 2525-2565.

* cited by examiner

HUNG MASS ACCELEROMETER WITH DIFFERENTIAL EDDY CURRENT SENSING

BACKGROUND OF THE INVENTION

1. Field of the Invention

This invention relates to accelerometers and more particularly to a class of accelerometers that use differential Eddy current sensing to provide improved sensitivity at lower cost and with higher reliability.

2. Description of the Related Art

The basic, open-loop accelerometer consists of a proof mass attached to a spring. The mass is constrained to move only in-line with the spring. Acceleration causes deflection of the mass. The displacement of the mass is measured. The acceleration is derived from the values of displacement, mass, and the spring constant. The system must also be damped to avoid oscillation. A closed-loop accelerometer typically achieves higher performance by using a feedback loop to cancel the deflection, thus keeping the mass nearly stationary. Whenever the mass deflects, the feedback loop causes an electric coil to apply an equally negative force on the mass, canceling the motion. Acceleration is derived from the amount of negative force applied. Because the mass barely moves, the non-linearities of the spring and damping system are greatly reduced. In addition, this accelerometer provides for increased bandwidth past the natural frequency of the sensing element. (Excerpted from Wikipedia "Inertial Navigation System" and "Accelerometer").

Conceptually, an accelerometer behaves as a damped mass on as spring. When the accelerometer experiences acceleration, the mass is displaced to the point that the spring is able to accelerate the mass at the same rate as the accelerometer body. The displacement is then measured to give the acceleration.

In commercial devices, piezoelectric, piezoresistive and capacitive components are commonly used to convert the mechanical motion into an electrical signal that is proportion to the displacement of the mass. Piezoelectric accelerometers rely on piezoceramics (e.g. lead zirconate titanate) or single crystals (e.g. quartz, tourmaline). They are unmatched in terms of their upper frequency range, low packaged weight and high temperature range. Piezoresistive accelerometers are preferred in high shock applications. Capacitive accelerometers typically use a silicon micro-machined sensing element in which the proof mass forms one side of the capacitive sense element. Their performance is superior in the low frequency range and they can be operated in servo mode to achieve high stability and linearity.

Modern accelerometers are often small micro electro-mechanical systems (MEMS), and are indeed the simplest MEMS devices possible, consisting of little more than a cantilever beam with a proof mass. Damping results from the residual gas sealed in the device. As long as the Q-factor is not too low, damping does not result in a lower sensitivity. Under the influence of external accelerations the proof mass deflects from its neutral position. This deflection is measured in an analog or digital manner. Most commonly, the capacitance between a set of fixed beams and a set of beams attached to the proof mass is measured. This method is simple, reliable, and inexpensive.

The performance of an accelerometer is primarily a combination of its bias stability and scale factor error. Bias stability is the acceleration measured by the device if the actual acceleration is zero. If the device is not accelerating due to imperfections of the device and electronics the readout will be nonzero. The scale factor error reflects the error as proportional to the actual acceleration. If for example the device is accelerating at 1 g (32 meters/sec/sec) and the device reads out 1.1 g, the scale factor error is 10%.

As shown in FIG. 1, the open-loop accelerometer with capacitive or piezoelectric sensing and the MEMs accelerometer exhibit bias stabilities typically much greater than 10 micro-g's and scale factor errors greater than 10 ppm. Although this level of performance is adequate for many commercial applications it is not sufficient for "strategic grade" military navigation systems that require bias stability less than 10 micro-g's and scale factor error less than 10 ppm. Even when provided with servo control in a closed-loop configuration the performance does not satisfy strategic grade navigation requirements. A completely different approach to precision navigation is to provide the system with a GPS receiver and the use the network of GPS satellites to measure the position of the system. This approach enables navigation position accuracy in the 1 meter class. Without the GPS enhancement, this equates to accelerometer bias stability better than 0.1 micro-g's and scale factor error of less than 0.5 ppm. However, the GPS approach is inherently dependent on outside sources of information (i.e. the GPS satellites) and thus is not considered to be an option for strategic military systems that might have to operate in GPS denied environments or under conditions in which the GPS satellite network may be degraded.

Currently, strategic grade military systems use a Pendulous Integrating Gyroscopic Accelerometer (PIGA) in which a pendulous mass is free to pivot by being mourned on a hearing (Excerpted from Wikipedia "PIGA accelerometer"). A spinning gyroscope is attached such that it would restrain the pendulum against "falling" in the direction of acceleration. The pendulous mass and its attached gyroscope are themselves mounted on a pedestal that can be rotated by an electric torque motor. The rotational axis of this pedestal is mutually orthogonal to the spin axis of the gyroscope as well as the axis that the pendulum is free to move in. The axis of rotation of this pedestal is also in the direction of the measured acceleration. The position of the pendulum is sensed by precision electrical contacts or by optical or electromagnetic means. Should acceleration displace the pendulum arm from its null position the sensing mechanism will operate the torque motor and rotate the pedestal such that the property of gyroscopic precession restores the pendulum to its null position. The rate of rotation of the pedestal gives the acceleration while the total number of rotations of the shaft gives the speed, hence the term integrating in the PIGA acronym.

PIGA class accelerometers provide strategic grade performance without requiring any outside sources of information. However, PIGA class accelerometers are expensive to build and maintain. The number of moving parts reduces reliability and requires periodic maintenance and recalibration.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a new class of accelerometer that provides improved performance at lower cost and with higher reliability. This class of accelerometer may provide commercial, strategic or potentially UPS grade performance.

This is accomplished by using a differential Eddy current sensor to sense the displacement of the proof mass in the accelerometer. This structure provides both the linearity and thermal stability required to improve performance with few moving parts that improve manufacturability and lower costs.

In an embodiment, a hung mass accelerometer comprises a body having an internal cavity. A first flexure is attached to the body inside the internal cavity. A proof mass is attached to the first flexure to hang inside the internal cavity. The proof mass is constrained to move in-line with the first flexure along a linear axis. More typically, the proof mass is suspended between first and second flexures of which one provides damping. First and second sensor heads are positioned on the body inside the internal cavity on opposite sides of the proof mass at distances d1 and d2 that increase and decrease in opposition as the proof mass moves along the linear axis. The sensor heads may be positioned within and collinear with the flexures.

Each sensor head includes a reference coil responsive to an alternating drive signal from a common oscillator to produce a primary oscillating magnetic field. The magnetic field induces Eddy currents in the proof mass that create an opposing secondary magnetic field that resists the primary magnetic field generated by the reference coil. Any change in the distance between the reference coil and the proof mass causes a change in the magnetic field interaction that alters an output signal. In different embodiments, the output signal is the drive signal that has been altered in phase or amplitude by the field interaction. Electronics compare the output signals from the first and second sensor heads to provide an output proportional to the displacement of the proof mass along the linear axis. Knowing the conversion between the output and displacement and any calibration coefficients, the electronics convert the output to a displacement. Knowing the mass of the proof mass and the stiffness of the flexure, the electronics converts the displacement to an acceleration of the body.

In an embodiment, the accelerometer has an "open-loop" configuration that allows the proof mass to move along the linear axis. In another embodiment, the accelerometer has a "closed-loop" configuration that uses a feedback loop to cancel the deflection, thus keeping the mass nearly stationary. Whenever the mass deflects, the feedback loop causes an electric coil to apply an equally negative force on the mass, canceling the motion. Acceleration is derived from the amount of negative force applied.

In an embodiment, the measured acceleration has a bias less than 10 micro-g's and a scale factor error less than 10 parts per million to provide strategic grade performance. In another embodiment, strategic grade performance is achieved in an "open-loop" configuration. In an embodiment, the measured acceleration is substantially linear with the displacement of the proof mass over a specified range of motion to provide strategic grade performance.

In an embodiment, resonant circuits formed in part by the reference coils in each of the sensor heads are tuned to have a resonant frequency at or near the frequency of the drive signal. In one configuration, the resonant circuits have the same resonant frequency. In another configuration, one resonant circuit has a resonant frequency slightly above the frequency of the drive signal and the other resonant circuit has a resonant frequency slightly below the frequency of the drive signal.

In an embodiment, the proof mass has a mass of at least 0.1 kg.

In an embodiment, the first sensor head resides within and is collinear with the first flexure. The second sensor head suitably resides within and is collinear with a second flexure connected to the proof mass opposite the first flexure.

These and other features and advantages of the invention will be apparent to those skilled in the art from the following detailed description of preferred embodiments, taken together with the accompanying drawings, in which:

DETAILED DESCRIPTION OF THE INVENTION

Conventional open-loop hung mass accelerometers are attractive because they are simple, hence relatively inexpensive and highly reliable. The conventional hung mass accelerometer uses single-sided capacitive sensing to sense the displacement of the proof mass. The proof mass forms one side of a variable capacitor. Displacement of the proof mass changes the capacitance, which in turn alters an output voltage.

When trying to achieve improved bias stability and scale factor error, the limitations of this approach are related to both the displacement of the proof mass and capacitive sensing. The displacement of the proof mass is sensitive to thermal variation; the proof mass will expand and contract with changes in temperature thereby producing an unpredictable error in the actual displacement. Furthermore, Hooke's Law that governs flexures states that the restoring force of the spring $F=-kd$ where k is the spring constant and d is the displacement. Hooke's Law assumes that the spring constant k is constant over the range of displacement. To a first order estimate this assumption holds. But in fact the spring constant k for these types of flexures changes over the range of displacement and does so in a nonlinear manner. Second, the capacitive sensor outputs a voltage that is proportional to the capacitance, which in turn is proportional to the displacement. The capacitance $C=\in A/d$ where $\in$ is the dielectric constant of the media between the parallel plates, A is the area of the capacitive plates and d is the distance between the plates, in this case the displacement of the proof mass. The equation assumes that capacitance varies linearly with displacement d, and only with displacement. In fact, the capacitive sensor is sensitive to changes in temperature and other factors such as transverse displacement, unwanted coupling and tilt.

Figure 1:
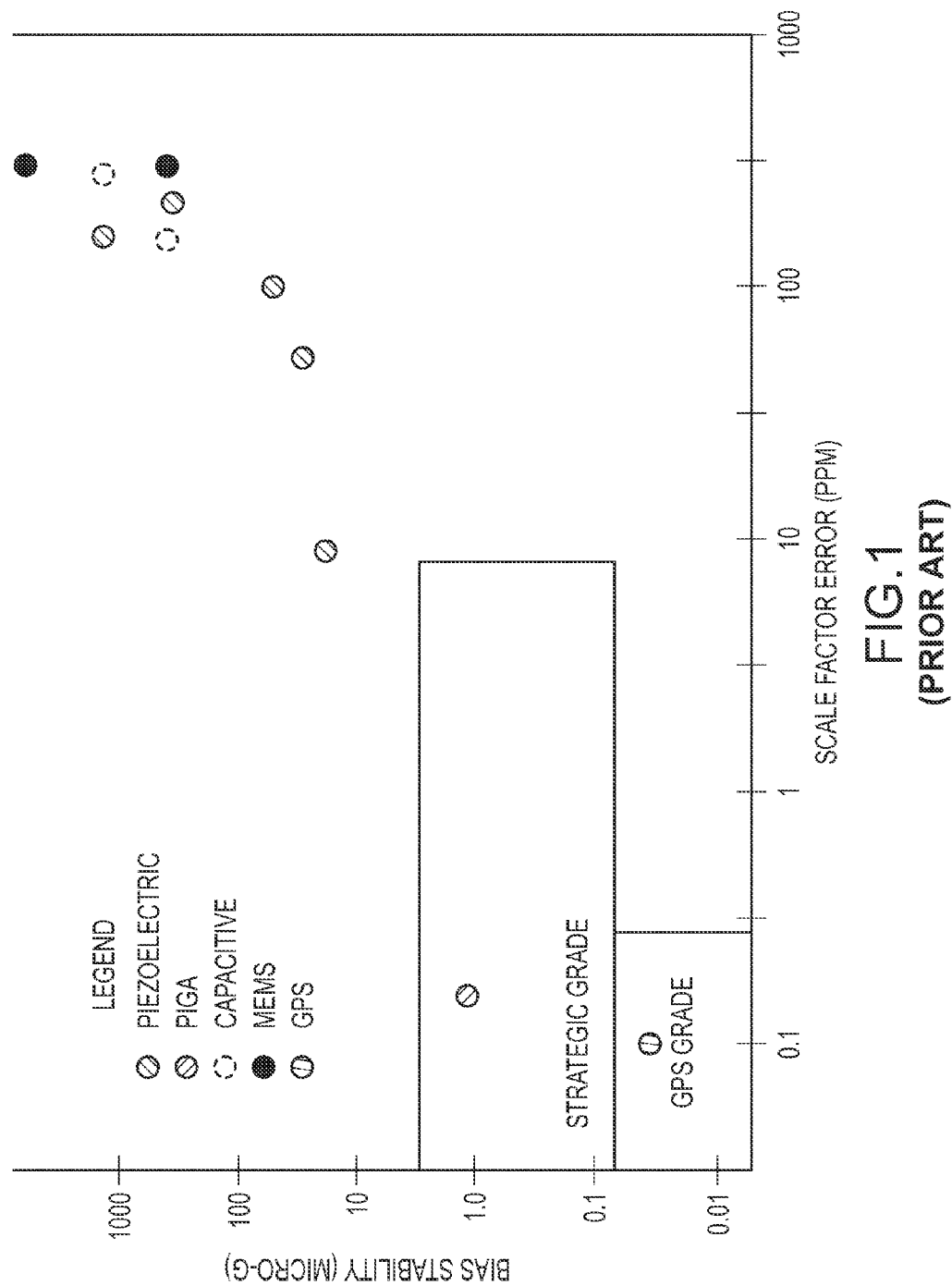
FIG. 1, as described above, is a plot of accelerometer bias stability versus scale factor error for different known classes or accelerometers.

The effect on performance of such capacitively coupled hung mass accelerometers is depicted in FIG. 1. Open-loop SFE is on the order of 500 ppm and bias stability is over 1,000 micro g's. Closed-loop servo control does reduce the problems of thermal variation and non-linearity but not sufficiently to achieve strategic grade performance over even close to it. Furthermore, servo control increases the cost of the accelerometer while reducing its reliability.

It is desirable to provide improved performance for an open-loop hung mass accelerometer. To do so one must simultaneously address the thermal stability and non-linearity issues of both the displacement of the proof mass and the sensor technology without compromising the benefits of the simple and reliable hung mass accelerometer. Of course, servo control may be added to operate in a closed-loop configuration to further improve performance.

A new class of accelerometer uses a differential Eddy current sensor to sense the displacement of the proof mass. This accelerometer can provide improved performance in an open-loop configuration based on the thermal stability and improved linearity of the differential Eddy current sensor. Each Eddy current sensor is thermally stable and inherently linear. The differential arrangement of the Eddy current sensor improves the thermal stability and linearity of the displacement of the proof mass. Any change in size of the proof mass due to a change in temperature is equal on both sides and nulled out. As the proof mass deflects it simultaneously moves closer to one sensor head as it moves further away from the other sensor head, which improves linearity. The accelerometer may provide lower cost alternatives to commercial grade accelerometers and lower cost and higher reliability alternatives to strategic grade accelerometers. The accelerometer may provide GPS grade performance.

Figure 2:
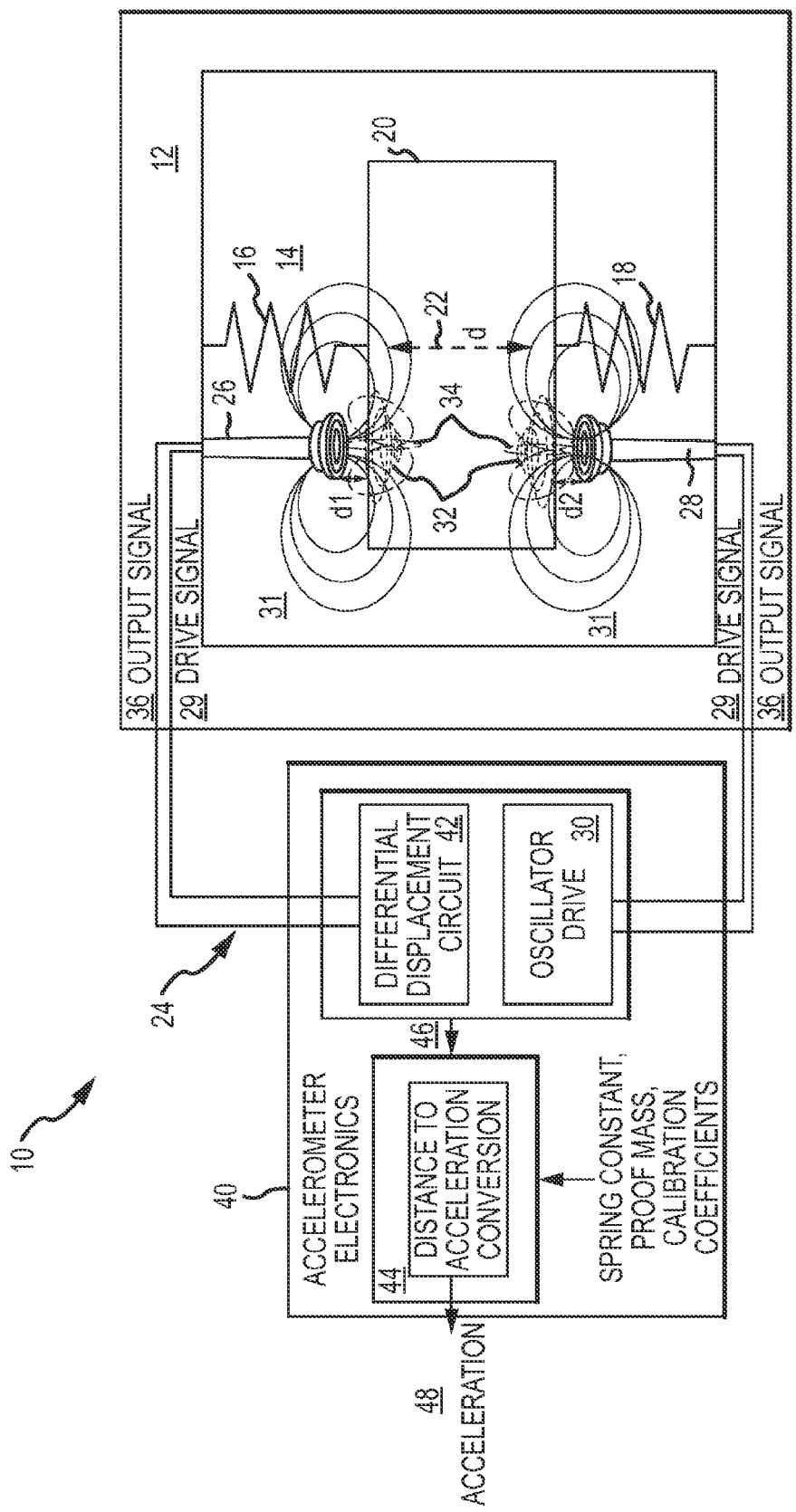
FIG. 2 is a diagram of an open-loop hung mass accelerometer with differential Eddy current sensing.

As shown in FIG. 2, an embodiment of a hung mass accelerometer 10 comprises a body 12 having an internal cavity 14. First and second flexures 16 and 18 are attached to the body 12 on opposite sides of the internal cavity 14 in a collinear arrangement. A proof mass 20 is attached between the first and second flexure to hang inside the internal cavity. The proof mass is suitably at least 0.01 kg, and more typically about 0.1 kg. The proof mass is constrained to move in-line with the first and second flexures along a linear axis 22. The two flexures have known, and suitably equal, stiffness. The device is suitably configured to provide a dampening of the motion of the proof mass 20 to inhibit resonance. One of the flexures may include magnets to provide magnetic dampening, air or a fluid.

The accelerometer is suitably configured to be very stiff in the other five degrees of freedom i.e. the other two linear axes orthogonal to axis 22 and the rotation around each of the three linear axes. For example, the flexures may have a stiffness that would allow displacement along axis 22 with a 100 Hz frequency whereas the stiffness in the other five degrees of freedom may limit any motion to around a 1 kHz frequency minimizing cross-coupling of the device. Essentially the accelerometer is configured to allow motion only along axis 22. An accelerometer may be provided for each of the six degrees of freedom or a lesser subset thereof as required by a particular application.

The accelerometer includes a differential Eddy current sensor 24 to sense the displacement of the proof mass 20 along linear axis 22. Sensor 24 comprises first and second sensor heads 26 and 28 positioned on the body 12 inside the internal cavity 14 on opposite sides of the proof mass 20 at distances d1 and d2 that increase and decrease in opposition as the proof mass moves along the linear axis 22. The sensor heads may be positioned adjacent the flexures as shown or may be positioned within and collinear with the flexures.

Each sensor head includes a reference coil responsive to an alternating drive signal 29 from a common oscillator 30 to produce an oscillating magnetic field 31. The magnetic field induces Eddy currents 32 in the proof mass 20 that create an opposing magnetic field 34 that resists the magnetic field 31 generated by the reference coil. The target surface on the proof mass should be at least three times larger than the diameter of the sensor head for normal, calibrated operation; otherwise, special calibration may be required. Any change in the distance (d1 or d2) between the reference coil and the proof mass due to a displacement d of the proof mass from a null position corresponding to no acceleration causes a change in the magnetic field interaction that alters an output signal 36. Typically, the output signal 36 is the drive signal 29 that has been altered in phase or amplitude by the field interaction.

If the proof mass 20 is closer the top sensor head 26 than the bottom sensor head 28, the Eddy currents due to the top sensor head 26 are larger in the proof mass than the Eddy currents due to the second sensor head 28 (which is further away). This in turn modifies the excitation in the top sensor head 26 more than the excitation in the bottom sensor head 28. The impedances seen by the sensor heads change differentially with the displacement of the proof mass. Consequently the output signals 36 are altered differentially. In an embodiment, output signals 36 are the drive signals 29 that have been differentially altered in phase or amplitude.

Accelerator electronics 40 comprise three functional blocks; oscillator 30, a differential displacement circuit 42 and a distance-to-acceleration conversion circuit 44. Oscillator 30 provides the common drive signal 29 to excite sensor heads 26 and 28. Differential displacement circuit 42 compares output signals 36 from sensor beads 26 and 28 to provide an output 46 proportional to the displacement d of the proof mass 20 along the linear axis 22. Output 46 may be a voltage or current signal that represents a change in impedance measured as a phase or amplitude of the output signal (e.g. altered drive signal) proportional to the displacement d. Knowing the mass of the proof mass, the spring constant (stiffness of the flexures) and any calibration coefficients, distance-to-acceleration circuit 44 converts output 46 to an acceleration 48 of the proof mass. These two functional circuits may, for example, be separate analog and digital circuits or may, for example, be a single circuit in which case output 46 may be an internal parameter.

Either the differential displacement circuit 42 or the distance-to-acceleration circuit 44 may perform intermediate step of converting output 46 to a displacement d. As shown, the distance-to-acceleration circuit performs the conversion. For a given sensor head, $Lsnr(d/r)=Ls*(1-K\ e^{-A(d/r)})$ where d is the coil to proof mass spacing, Lsnr is the total sensor inductance (nominal plus Eddy current induced), Ls is the reference coil inductance when the proof mass is infinitely far away (d=infinity), K=0.5 to 0.75 (for typical proof mass materials), A is a constant depending on the proof mass material and r is the reference coil winding radius. Similarly, the total sensor resistance is $Rsnr(d/r)=Rs*(1+C\ e^{-B(d/r)})$ where B and C are constants depending on the proof mass material and B>A and C<K. The relative increase in inductance is more significant than the decrease in reflected resistance for increasing d. Thus, the change in the reference coil inductance is the basis for Eddy current sensing. The differential phase or amplitude from output 46 is mapped to a change in differential impedance. This change in impedance is related to the distance d through the above equations.

Once displacement d is known, Hooke's law can infer the force F operating on the spring, i.e. F=kd, where k is the spring constant. Once the force F is known, acceleration is determined through Newton's Law F=Ma, where M is the mass of the proof mass. As previously discussed, Hooke's Law assumes that the spring constant k is in fact constant over the possible displacement range, which strictly speaking is not true at the levels of performance required for strategic grade performance. In addition, the sensor itself has nonlinearities due to non-perfect electronics and sometimes the physics of the sensing mechanism. The differential topology of the Eddy current sensor heads has the advantage that when the proof mass is far from one sensor head it is simultaneously close to the other sensor head. Consequently, without any further compensation the system output is more linear. Furthermore, it is simpler to remove any remaining non-linearity of both the spring constant as well as the sensor through calibration and the application of calibration coefficients to compute the displacement or acceleration. Owing to the thermal stability and linearity of the differential Eddy current sensor, the acceleration 48 is substantially linear with the displacement d of the proof mass over a specified range of motion.

Figure 3A:
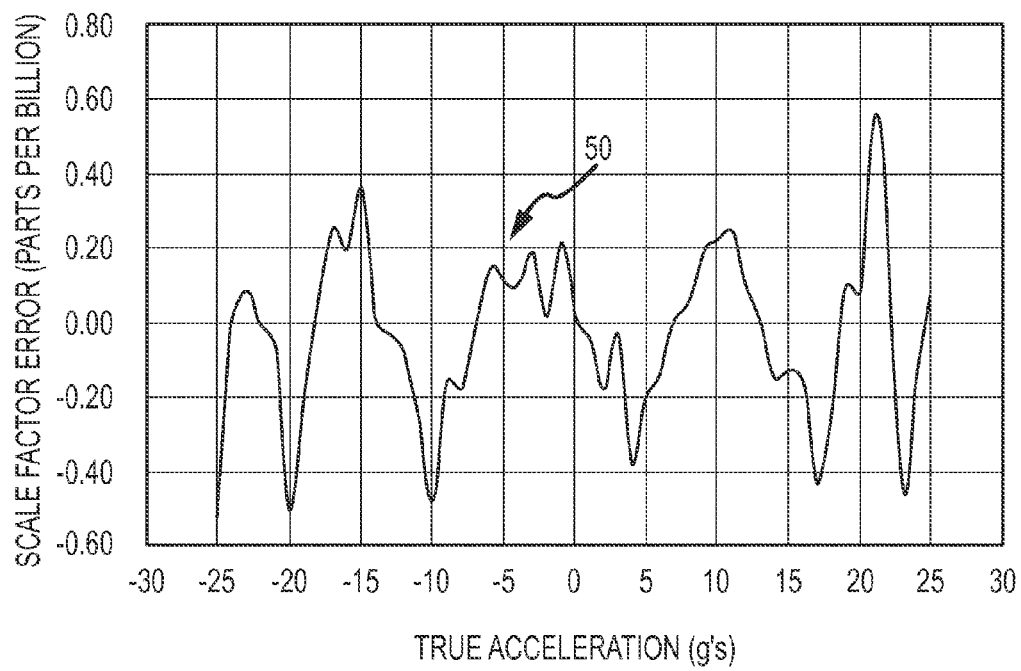
FIGS. 3a and 3b are plots of scale factor error and bias stability for the open-loop hung mass accelerometer with differential Eddy current sensing exhibiting strategic grade performance.
Figure 3B:
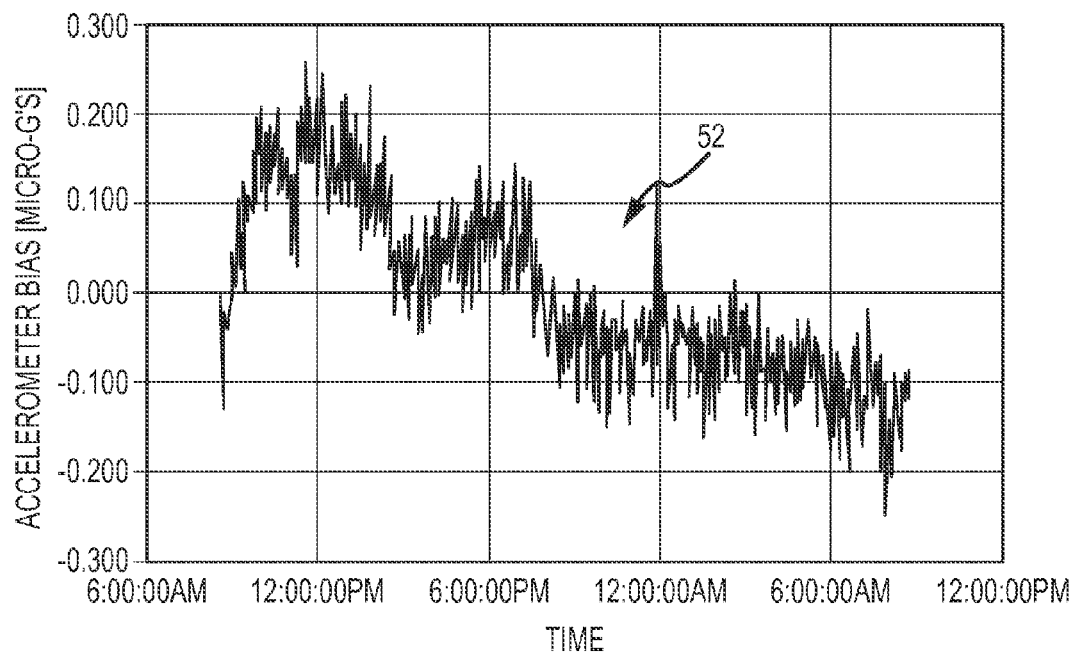

As shown in FIGS. 3a and 3b, the scale factor error 50 and acceleration bias 52 are each well within the desired performance region for strategic grade performance shown in FIG. 1. Acceleration bias 52 is measured as the readout of the accelerometer over time when the actual acceleration is zero. Scale factor error 50 is measured by changing the known acceleration and measuring the output.

Individual Eddy current sensors exist for measuring proximity to an object (e.g. U.S. Pat. No. 4,563,643), measuring angle and/or deflection (e.g. U.S. Pat. No. 5,214,379) and detecting defects in an object (Javier Garcia-Martin et al, "Non-Destructive Techniques Based on Eddy Current Testing, Sensors 2011, 11, 2525-2565). One approach is to position two Eddy current sensor heads that are configured to measure proximity as shown in FIG. 2, drive them from a common oscillator and compare their differential outputs. To improve sensitivity of a differential amplitude measurement, the resonant circuits formed in part by the reference coils in each of the sensor heads are tuned to have a resonant frequency at or near the frequency of the drive signal. In one configuration, the resonant circuits have the same resonant frequency. In another configuration, one resonant circuit has a resonant frequency slightly above the frequency of the drive signal and the other resonant circuit has a resonant frequency slightly below the frequency of the drive signal. U.S. Pat. No. 4,816,759 discloses a differential Eddy current sensor for detecting displacement of optical elements. This differential Eddy current sensor may be adapted for use in the hung-mass accelerometer.

Figure 4:
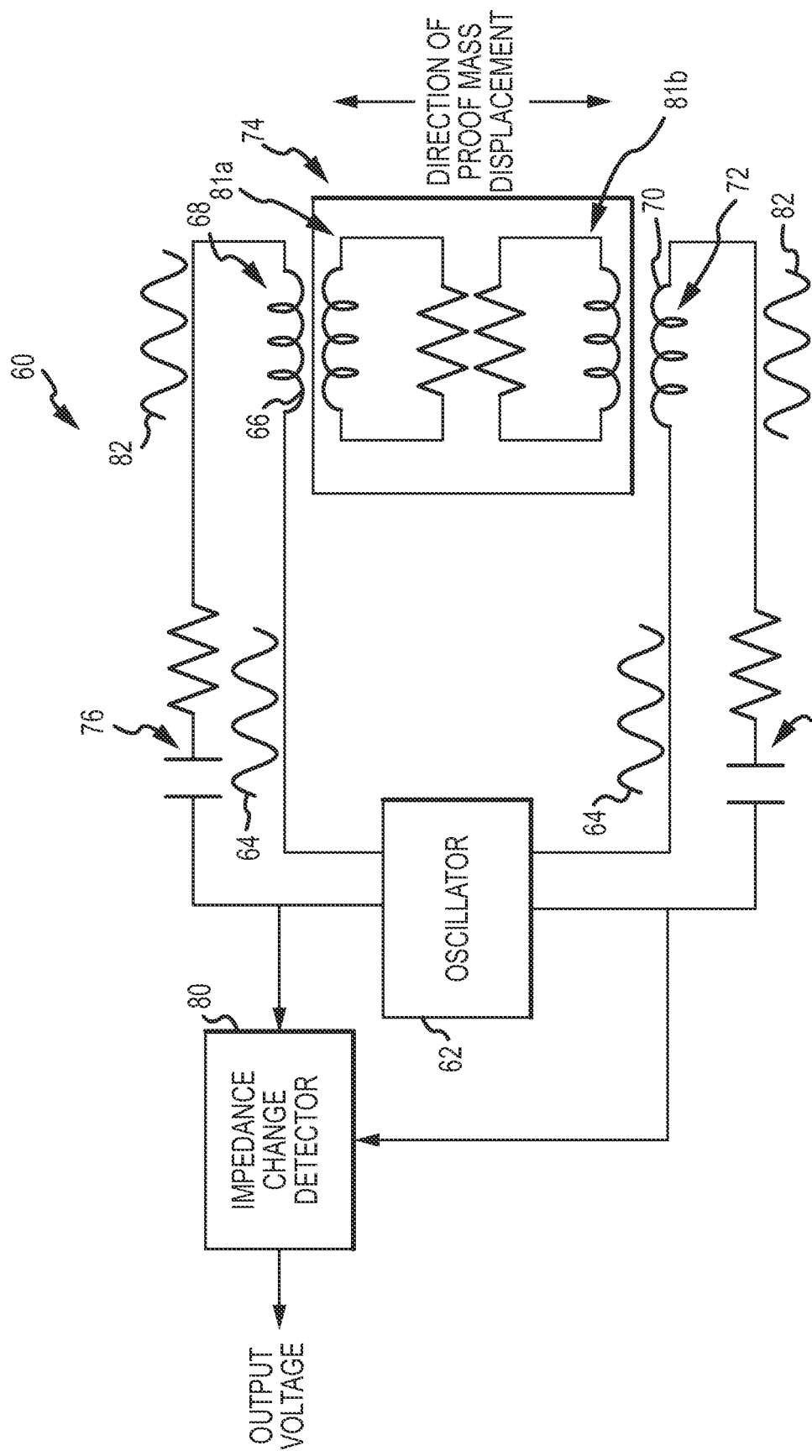
FIG. 4 is a diagram of an embodiment of the differential Eddy current sensor.

With reference now to FIG. 4, an embodiment of a differential Eddy current sensor 60 comprises in part a common oscillator 62 that supplies an alternating drive current 64 to a reference coil 66 of sensor head 1 68 and a reference coil 70 of sensor head 2 72. Sensor heads 1 and 2 are placed on opposite sides of the suspended proof mass 74. As the proof mass is displaced in response to acceleration, the distances between the proof mass and the sensor heads increase and decrease in opposition. A differential displacement circuit 74 includes a tuned impedance 76 (e.g. a series connected capacitor and resistor) that is connected in series with reference coil 66 of sensor head 1 68 to form a resonant circuit, a tuned impedance 78 (e.g. a series connected capacitor and resistor) that is connected in series with reference coil 70 of sensor head 2 72 to form a resonant circuit, and an impedance change detector 80. The resonant circuits may be tuned to have the same or different resonant frequencies. In an embodiment, the resonant frequency of one circuit is slightly greater than the frequency of the drive current and the resonant frequency of the other circuit is slightly less than the frequency of the drive current.

When each reference coil is driven by the alternating drive current 64, an oscillating magnetic field is generated that induces Eddy currents in the proof mass 74. The Eddy currents induced in the proof mass circulate in Eddy current impedances 81a and 81b represented by a parallel inductor and resistor connection in a direction to produce a secondary magnetic field opposite that of the reference coil, reducing the magnetic flux in the reference coil and thereby the reference coil inductance. The Eddy currents also dissipate energy, increasing the reference coil's effective resistance.

The reference coil constitutes the primary and the proof mass the (shorted) secondary of a weakly coupled air-core transformer. Displacement of the proof mass changes the coupling, and this displacement is reflected as an impedance change at the terminals of the reference coil, which in turn produces an altered drive current 82 As the proof mass approaches the reference coil, the inductance goes down and the reflected resistance increases. By electronically comparing the impedance changes in the two altered sensor head drive currents 82 (such as amplitude and/or phase changes), the relative displacement between the two sensor heads can be determined accurately.

Figure 5A:
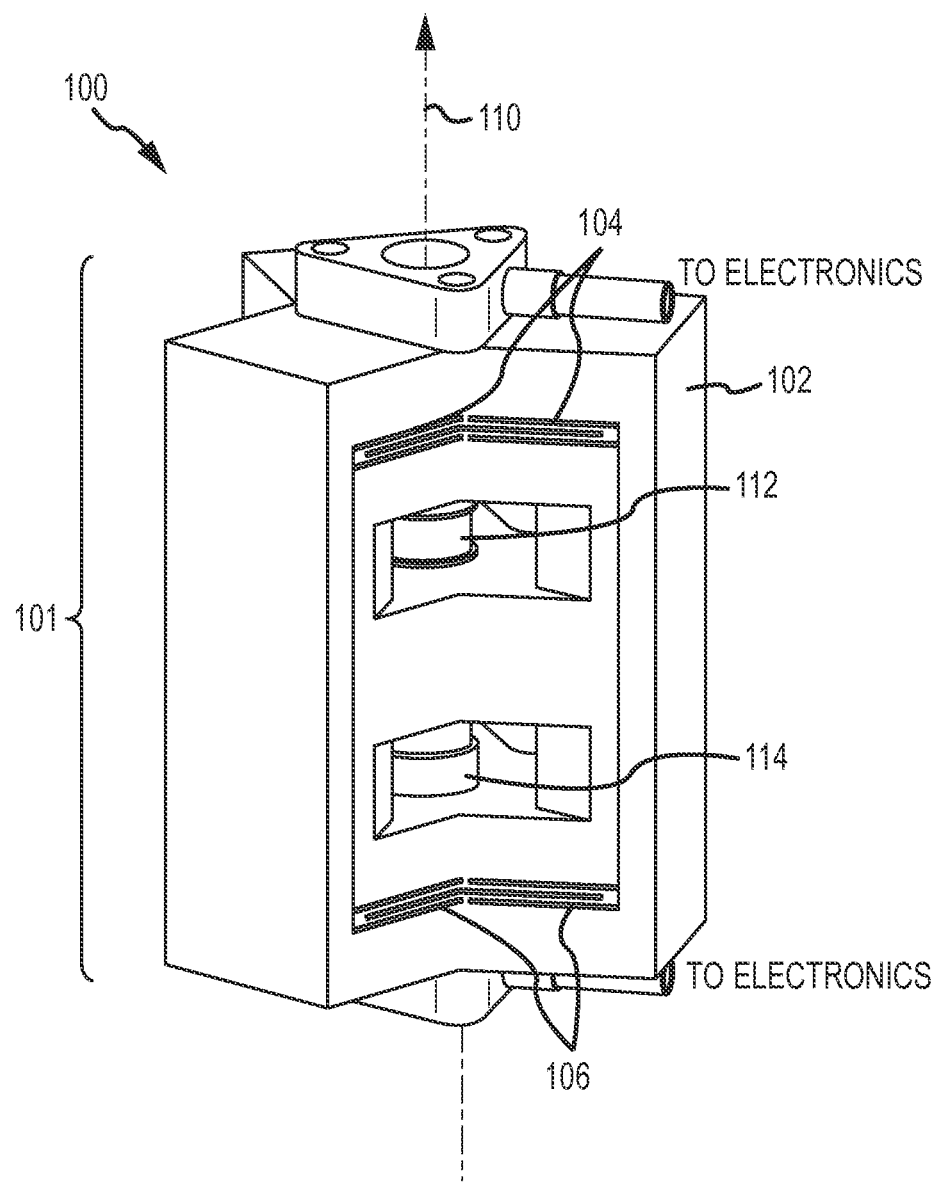
FIGS. 5a and 5b are perspective and sectional views of an embodiment of an open-loop hung mass accelerometer with differential Eddy current sensing.
Figure 5B:
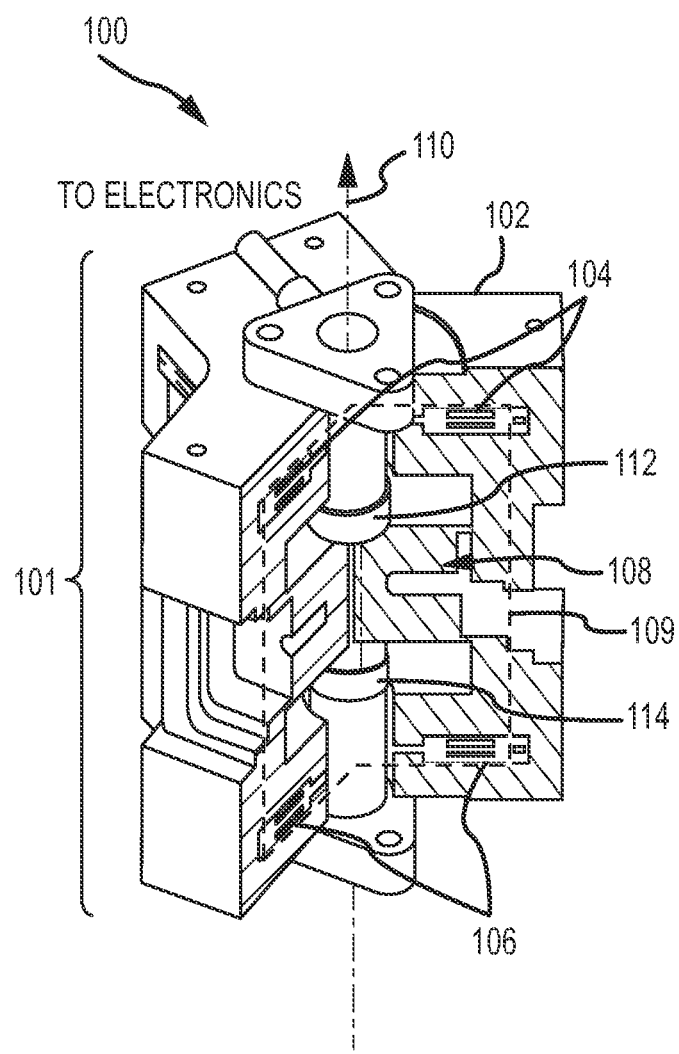

With reference now to FIGS. 5a and 5b, an embodiment of an open-loop hung mass accelerometer 100 sans the electronics comprises a single piece of metal 101 (e.g. Ti 6Al-4V or 17-4PH stainless steel) machined to form a body 102, top and bottom flexures 104 and 106 and a proof mass 108 suspended between the flexures inside an internal cavity 109 to deflect along an axis 110 through the center of the body. The flexures allow movement of the proof mass in the compliant direction along axis 110 at a resonance of ~100 Hz. The body restricts movement in the non-compliant directions orthogonal to axis 110 or in rotation about any of the linear axes to reduce unwanted cross coupling of transverse accelerations into the main sensing axis. These other modes are all >~10 times the frequency of the compliant direction (in this case 100 Hz) and do not nominally result in sensed motion. The structure is about ~2.5"×2"×2" and weighs about ~0.35 lbs. Metal 101 is machined to form openings around and along axis 110 on either side of proof mass 108 to receive Eddy current sensor heads 112 and 114. The sensor heads lie within and collinear with the flexures and the axis of motion.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A hung mass accelerometer, comprising:
   a body having an internal cavity;
   a first flexure attached to the body inside the internal cavity, said first flexure compliant along a linear axis;
   a proof mass attached to the first flexure to hang inside the internal cavity, said proof mass allowed to move in-line with the first flexure along the linear axis in an open-loop configuration;
   an oscillator that generates an alternating drive signal;
   first and second sensor heads positioned on the body inside the internal cavity on opposite sides of the proof mass at distances d1 and d2 that increase and decrease in opposition as said proof mass moves along the linear axis, each said sensor head having a reference coil responsive to the alternating drive signal to produce a primary oscillating magnetic field that induces Eddy currents in the proof mass that create an opposing secondary magnetic field that resists the primary magnetic field generated by the reference coil, any change in the distance between the reference coil and the proof mass causing a change in the magnetic field interaction that alters an output signal; and a first electrical circuit configured to compare the output signals from the first and second sensor heads to provide an output proportional to the displacement of the proof mass along the linear axis; and a second electrical circuit configured to convert the output to a measured acceleration of the body knowing the mass of the proof mass and the stiffness of the flexure.

2. The hung mass accelerometer of claim 1, wherein the body, first flexure and proof mass are integrally formed from a single piece of machined metal.

3. The hung mass accelerometer of claim 1, wherein the measured acceleration is substantially linear with the displacement of the proof mass over a specified range of motion.

4. The hung mass accelerometer of claim 2, wherein the first flexure comprises three flexures positioned about the linear axis and attached to the top of the proof mass, further comprising a second flexure comprising three flexures positioned about the linear axis attached to the bottom of the proof mass, wherein said first and second flexures and said proof mass deflect along the linear axis.

5. A hung mass accelerometer, comprising:
a body having an internal cavity;
a first flexure attached to the body inside the internal cavity, said first flexure compliant along a linear axis;
a proof mass attached to the first flexure to hang inside the internal cavity, said proof mass allowed to move in-line with the first flexure along the linear axis;
an oscillator that generates an alternating drive signal;
first and second sensor heads positioned on the body inside the internal cavity on opposite sides of the proof mass at distances d1 and d2 that increase and decrease in opposition as said proof mass moves along the linear axis, each said sensor head having a reference coil responsive to the alternating drive signal to produce a primary oscillating magnetic field that induces Eddy currents in the proof mass that create an opposing secondary magnetic field that resists the primary magnetic field generated by the reference coil, any change in the distance between the reference coil and the proof mass causing a change in the magnetic field interaction that produces differential alterations to the alternating drive signal; and
a first electrical circuit configured to compare the altered drive signals from the first and second sensor heads to provide an output proportional to the displacement of the proof mass along the linear axis; and
a second electrical circuit configured to convert the output to a measured acceleration of the body knowing the mass of the proof mass and the stiffness of the flexure.

6. The hung mass accelerometer of claim 5, wherein the measured acceleration has a bias less than 10 micro-g's and a scale factor error less than 10 parts per million.

7. The hung mass accelerometer of claim 5, wherein the proof mass has a mass of at least 0.01 kg.

8. The hung mass accelerometer of claim 5, further comprising:
a second flexure attached to the proof mass and body inside the internal cavity opposite the first flexure along the linear axis, wherein the first sensor head resides within and collinear with the first flexure and the second sensor head resides within and collinear with the second flexure along the linear axis.

9. The hung mass accelerometer of claim 8, wherein the body, first and second flexures and proof mass are integrally formed from a single piece of machined metal.

10. A hung mass accelerometer, comprising:
a body having an internal cavity;
a first flexure attached to the body inside the internal cavity, said first flexure compliant along a linear axis;
a proof mass of at least 0.01 kg attached to the first flexure to hang inside the internal cavity, said proof mass constrained to move in-line with the first flexure along the linear axis in an open-loop configuration;
an oscillator that generates an alternating drive signal;
first and second sensor heads positioned on the body inside the internal cavity on opposite sides of the proof mass at distances d1 and d2 that increase and decrease in opposition as said proof mass moves along the linear axis, each said sensor head having a reference coil responsive to the alternating drive signal to produce an oscillating primary magnetic field that induces Eddy currents in the proof mass that create an opposing secondary magnetic field that resists the primary magnetic field generated by the reference coil, any change in the distance between the reference coil and the proof mass causing a change in the magnetic field interaction that alters the drive signal;
a first electrical circuit configured to compare the altered drive signals from the first and second sensor heads to provide an output proportional to the displacement of the proof mass along the linear axis; and
a second electrical circuit configured to convert the output to a measured acceleration of the body knowing the mass of the proof mass and the stiffness of the flexure, said measured acceleration having a bias less than 10 micro-g's and a scale factor error less than 10 parts per million.

11. The hung mass accelerometer of claim 10, wherein the first sensor head resides within and collinear with the first flexure along the linear axis.

12. The hung mass accelerometer of claim 10, further comprising:
a second flexure attached to the proof mass and body inside the internal cavity opposite the first flexure along the linear axis, wherein the first sensor head resides within and collinear with the first flexure and the second sensor head resides within and collinear with the second flexure along the linear axis.

13. The hung mass accelerometer of claim 12, wherein the body, first and second flexures and proof mass are integrally formed from a single piece of machined metal.

14. The hung mass accelerometer of claim 10, wherein the body, first flexure and proof mass are integrally formed from a single piece of machined metal.

15. The hung mass accelerometer of claim 10, wherein the measured acceleration is substantially linear with the displacement of the proof mass over a specified range of motion.

16. A hung mass accelerometer, comprising:
a body having an internal cavity;
first and second flexures attached to the body on opposite sides of the internal cavity, said first and second flexures compliant along a linear axis;
a proof mass of at least 0.01 Kg attached between the first and second flexures to hang inside the internal cavity, said proof mass constrained to move in-line with the first and second flexures along the linear axis;
an oscillator that generates an alternating drive signal;
first and second sensor heads positioned within and collinear with the first and second flexures along the linear axis, respectively, on opposite sides of the proof mass at distances d1 and d2 that increase and decrease in opposition as said proof mass moves along the linear axis, each said sensor head having a reference coil responsive to the alternating drive signal to produce an oscillating primary magnetic field that induces Eddy currents in the proof mass that create an opposing secondary magnetic field that resists the primary magnetic field generated by the reference coil, any change in the distance between the reference coil and the proof mass causing a change in the magnetic field interaction that alters the drive signal;

a first electrical circuit configured to compare the altered drive signals from the first and second sensor heads to provide an output proportional to the displacement of the proof mass along the linear axis; and a second electrical circuit configured to convert the output to a measured acceleration of the body knowing the mass of the proof mass and the stiffness of the flexure.

17. The hung mass accelerometer of claim 16, wherein the measured acceleration has a bias less than 10 micro-g's and a scale factor error 10 parts per million.

18. The hung mass accelerometer of claim 17, wherein the accelerometer has an open-loop configuration that allows the proof mass to move along the linear axis.

19. The hung mass accelerometer of claim 16, wherein the body, first and second flexures and proof mass are integrally formed from a single piece of machined metal.

20. The hung mass accelerometer of claim 16, wherein the measured acceleration is substantially linear with the displacement of the proof mass over a specified range of motion.

\* \* \* \* \*